United States Patent
Tanigawa et al.

(10) Patent No.: US 8,995,006 B2
(45) Date of Patent: Mar. 31, 2015

(54) IMAGE FORMING APPARATUS, IMAGE FORMING METHOD AND IMAGE READING APPARATUS

(71) Applicant: Fuji Xerox Co., Ltd., Minato-ku, Tokyo (JP)

(72) Inventors: Tomohiro Tanigawa, Kanagawa (JP); Osamu Goto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 29 days.

(21) Appl. No.: 13/739,522

(22) Filed: Jan. 11, 2013

(65) Prior Publication Data

US 2014/0009767 A1 Jan. 9, 2014

(30) Foreign Application Priority Data

Jul. 5, 2012 (JP) ................. 2012-151215

(51) Int. Cl.
*G06F 15/00* (2006.01)
*G06K 1/00* (2006.01)
*G06K 15/02* (2006.01)
*H04N 1/393* (2006.01)
*H04N 1/60* (2006.01)

(52) U.S. Cl.
CPC .................... *H04N 1/393* (2013.01)
USPC .......................... 358/1.2; 358/1.9

(58) Field of Classification Search
CPC .......... H04N 1/00013; H04N 1/00015; H04N 1/00018
USPC ............................ 358/1.2, 1.1, 1.9, 1.13, 1.14
See application file for complete search history.

(56) References Cited

U.S. PATENT DOCUMENTS

| 5,600,807 | A | * | 2/1997 | Itoh et al. ........................ 711/211 |
| 7,405,842 | B2 | * | 7/2008 | Lee et al. ........................ 358/1.2 |
| 2005/0286922 | A1 | * | 12/2005 | Oki ................................. 399/75 |
| 2006/0000991 | A1 | * | 1/2006 | Ito ................................. 250/587 |
| 2008/0316511 | A1 | * | 12/2008 | Sakamoto ..................... 358/1.9 |
| 2009/0296167 | A1 | * | 12/2009 | Motoyama .................... 358/474 |
| 2012/0121308 | A1 | * | 5/2012 | Higuchi et al. ............... 400/621 |

FOREIGN PATENT DOCUMENTS

| JP | 2004-347842 A | 12/2004 |
| JP | 2005-274950 A | 10/2005 |

* cited by examiner

*Primary Examiner* — Douglas Tran
(74) *Attorney, Agent, or Firm* — Sughrue Mion, PLLC (57) ABSTRACT

An image forming apparatus includes an image reading section that reads an image on paper to generate image data, and an image forming section that forms on paper an image based on image data. The image forming section forms on paper a dimension correction image including marks. The image forming section includes a computation unit that performs computation using dimension correction image data, obtained by reading the dimension correction image, to generate dimension correction data, and a memory that stores the dimension correction data. The image forming section corrects image data using the stored dimension correction data and forms an image based on the corrected image data. The computation unit has a first computation mode of generating first dimension correction data based on distances between the marks and a second computation mode of generating second dimension correction data based on distances between edges of paper and the marks.

10 Claims, 5 Drawing Sheets

IMAGE FORMING APPARATUS, IMAGE FORMING METHOD AND IMAGE READING APPARATUS

CROSS-REFERENCE TO RELATED APPLICATIONS

This application is based on and claims priority under 35 USC 119 from Japanese Patent Application No. 2012-151215 filed Jul. 5, 2012.

BACKGROUND

Technical Field

The present invention relates to an image forming apparatus, an image forming method, and an image reading apparatus.

SUMMARY

According to an aspect of the invention, there is provided an image forming apparatus including an image reading section and an image forming section. The image reading section includes a paper table on which paper is to be positioned and reads an image on paper positioned on the paper table to generate image data. The image forming section forms on paper an image based on image data. The image forming section has a dimension correction mode in which a dimension correction image used to correct dimensions of an image is formed on paper. The dimension correction image includes plural marks at positions separated from each other on the paper. The image forming section includes a computation unit and a memory. The computation unit performs computation by using dimension correction image data to generate dimension correction data used to correct dimensions of an image. The dimension correction image data is obtained by the image reading section by reading, from paper on which the dimension correction image has been formed and which is positioned on the paper table, the dimension correction image. The memory stores the dimension correction data generated by the computation unit. The image forming section corrects image data in accordance with the dimension correction data stored in the memory and forms an image based on the corrected image data. The computation unit has a first computation mode in which first dimension correction data is generated on the basis of distances between the plural marks in data of a dimension correction image represented by the dimension correction image data and a second computation mode in which second dimension correction data is generated on the basis of distances between individual edges of paper and the corresponding marks in data of a dimension correction image represented by the dimension correction image data. The first dimension correction data is one kind of the dimension correction data. The second dimension correction data is one kind of the dimension correction data.

BRIEF DESCRIPTION OF THE DRAWINGS

Exemplary embodiments of the present invention will be described in detail based on the following figures, wherein.

DETAILED DESCRIPTION

Referring to the accompanying drawings, exemplary embodiments of the present invention will be described below.

Figure 1:
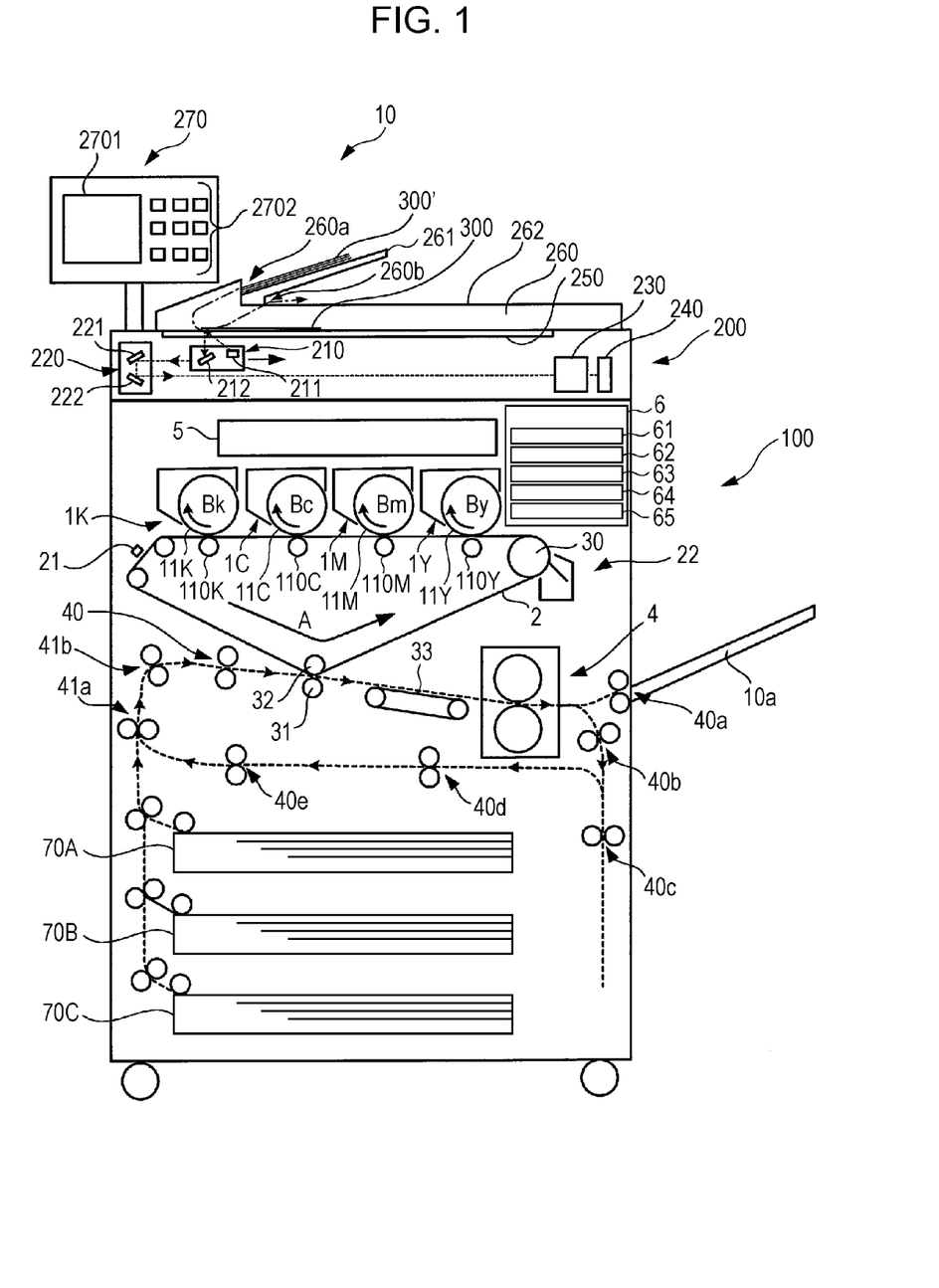
FIG. 1 illustrates an overall configuration of an image forming apparatus according to exemplary embodiments.

FIG. 1 illustrates an overall configuration of an image forming apparatus 10 according to the exemplary embodiments.

This image forming apparatus 10 includes an image reading section 200, an image forming section 100, and an operation section 270. The image reading section 200 reads an image on paper and generates image data representing the image. The image forming section 100 forms a read image on another paper in accordance with image data. The operation section 270 receives, from the user, input of various pieces of image formation information, such as specification of the number of copies to be output, selection of single-sided printing or double-sided printing, and specification of a tray that holds paper on which images are to be printed.

The operation section 270 includes a touch panel display screen 2701 and a group of buttons 2702. The group of buttons 2702 includes a start button used to input an instruction to start image reading and image formation, numeral buttons used to input values when the number of copies to be output or the like is specified, and various buttons, such as a button used to control the image forming apparatus 10. This group of buttons 2702 also includes an amount-of-correction computation mode button, which is used to set an amount-of-correction computation mode in which various amounts of correction, such as the amount of correction regarding the image formation position on paper and the amount of correction regarding the dimensions of an image on paper (the scaling relative to the reference dimensions), are to be computed. This amount-of-correction computation mode will be described later.

The image reading section 200 includes an upper covering 260 that is opened and closed by the user, and transparent glass 250 disposed under the upper covering 260. This image reading section 200 also includes, below the transparent glass 250, components for reading an image on paper.

As the components for reading an image, the image reading section 200 includes a first carriage 210, a second carriage 220, a lens unit 230, and a line sensor 240. The first carriage 210 includes a lamp 211 and a first mirror 212. The first carriage 210 is a component capable of moving in the horizontal direction in FIG. 1. This first carriage 210 functions to radiate light to a to-be-read image by using the lamp 211 and to receive the reflected light. The second carriage 220 includes a second mirror 221 and a third mirror 222. The second carriage 220 is a component capable of moving in the horizontal direction in FIG. 1 like the first carriage 210. This second carriage 220 and the lens unit 230 function to lead the reflected light having been received by the first carriage 210 to the line sensor 240. The line sensor 240 functions to receive this reflected light and to generate image data representing the image.

As reading modes of reading an image on paper, this image reading section 200 has a transporting reading mode and a stationary reading mode. In the transporting reading mode, paper 300' positioned on a document tray 261 is drawn from a paper feed opening 260a one by one and is transported by a mechanism, not illustrated, to a paper output opening 260b along a transportation path illustrated by a dot-and-dash line arrow. This transporting reading mode is a reading mode in which an image on the currently transported paper is read with the first carriage 210 that is stationary and the paper is then fed to a paper output table 262. On the other hand, the stationary reading mode is a reading mode in which paper 300 is positioned on the transparent glass 250 and an image is read with the first carriage 210 that is moving in the direction of a solid line arrow in FIG. 1. In this stationary reading mode, a surface of the transparent glass 250 that faces the upper covering 260 serves as a document table on which the paper 300 having a to-be-read image thereon is positioned. The user opens the upper covering 260, positions the paper 300 on the transparent glass 250 so that a side of the paper 300 having a to-be-read image faces down in FIG. 1, and closes the upper covering 260. As a result, the paper is pressed from the above. In the stationary reading mode, in this state, the first carriage 210 radiates light to the paper 300 positioned on the transparent glass 250 while moving, whereby the image on the paper 300 is read. When this first carriage 210 moves, the second carriage 220 also moves in the same direction at a half the speed of the first carriage 210 to maintain an optical-path length for the reflected light from the paper 300 to reach the line sensor 240 to be substantially constant.

The image forming section 100 includes image forming units 1K, 1C, 1M, and 1Y for forming images of colors of black (K), cyan (C), magenta (M), and yellow (Y), respectively, and an exposure unit 5 that radiates a laser beam. These image forming units 1K, 1C, 1M, and 1Y include multilayer electrophotographic developer carriers 11K, 11C, 11M, and 11Y that rotate in directions of arrows Bk, Bc, Bm, and By in FIG. 1, respectively. In addition to the developer carrier described above, each of the image forming units 1K, 1C, 1M, and 1Y includes a charging device and a developing device, not illustrated. The developer carrier in each image forming unit is charged by the charging device, not illustrated, so that a surface potential reaches a predetermined potential. The exposure unit 5 then performs raster scan on each of the charged developer carriers 11K, 11C, 11M, and 11Y in the direction along the rotation axis of the rotating developer carrier by using a laser beam modulated based on image data, whereby an electrostatic latent image resulting from the potential distribution is formed on the developer carrier. The developing device, not illustrated, electrostatically attaches toners in a developer including charged toners, to this electrostatic latent image so as to develop the electrostatic latent image. As a result, an image developed with the toners is formed on the developer carrier.

Under the image forming units 1K, 1C, 1M, and 1Y in FIG. 1, there is disposed an intermediate transfer belt 2 that moves in a direction of an arrow A in FIG. 1 with being in contact with the individual developer carriers 11K, 11C, 11M, and 11Y. At positions opposite to the developer carriers 11K, 11C, 11M, and 11Y with the intermediate transfer belt 2 being disposed therebetween, first transfer rollers 110K, 110C, 110M, and 110Y are provided, respectively. To this intermediate transfer belt 2, the developed images formed on the individual developer carriers 11K, 11C, 11M, and 11Y are transferred (first transfer) and the intermediate transfer belt 2 transports a first transfer image.

In addition to the image forming units 1K, 1C, 1M, and 1Y, the intermediate transfer belt 2, and the exposure unit 5 described above, the image forming section 100 further includes a second transfer roller 31 and a fixing device 4. The second transfer roller 31 performs second transfer of transferring onto paper the first transfer image on the intermediate transfer belt 2. The fixing device 4 fixes an unfixed second transfer image, which has been transferred onto paper, on the paper. In the vicinity of the intermediate transfer belt 2, there is provided a sensor 21 that detects test images of individual colors which have been formed by the corresponding image forming units 1K, 1C, 1M, and 1Y and have been transferred onto the intermediate transfer belt 2, at the time of adjusting relative positions and scaling between the test images that have been subjected to first transfer from the individual developer carriers 11K, 11C, 11M, and 11Y. In this adjustment of relative positions and scaling, the sensor 21 detects the test images of the individual colors that have been transferred onto the intermediate transfer belt 2. Based on the detection result, the image forming units 1K, 1C, 1M, and 1Y are adjusted so that the relative positions and scaling of the test images of the individual colors become appropriate.

The image forming section 100 also includes three paper holding trays, namely, a first tray 70A, a second tray 70B, and a third tray 70C; and a driving roller 30 that drives the intermediate transfer belt 2. The intermediate transfer belt 2 receives the driving force from the driving roller 30 to rotate in the direction of the arrow A in FIG. 1 with being stretched around the driving roller 30 and plural other rollers. The intermediate transfer belt 2 is pressed toward the second transfer roller 31 by a backup roller 32. The first transfer image on the intermediate transfer belt 2 undergoes second transfer performed by the second transfer roller 31 onto paper, which has been taken out from one of the first tray 70A, the second tray 70B, and the third tray 70C and has been transported to the second transfer roller 31. The paper having undergone the second transfer is further transported, and a second transfer image on the paper is fixed onto the paper by the fixing device 4. The paper is then output to a paper output tray 10a. In the vicinity of the intermediate transfer belt 2, there is provided a cleaning device 22 that removes residual toners on the intermediate transfer belt 2 after the second transfer onto paper. The above-described test images of the individual colors that are formed on the intermediate transfer belt 2 at the time of adjustment of relative positions and scaling between the images resulting from the first transfer from the corresponding developer carriers 11K, 11C, 11M, and 11Y are also removed by this cleaning device 22 without undergoing the second transfer performed by the second transfer roller 31.

This image forming apparatus 10 includes a controller 6 that controls individual components included in the image forming section 100. The controller 6 includes a read image memory 64 that stores image data generated by the line sensor 240 of the image reading section 200 described above. In the image forming apparatus 10, misregistration of an image formed on paper and variations in scaling of images occur because of errors in transportation of paper and errors in dimensions and positions of the image forming units 1K, 1C, 1M, and 1Y. Accordingly, this image forming apparatus 10 forms a test image on paper, reads the test image on the paper by using the image reading section 200, and computes various amounts of correction, such as the amount of correction regarding the image formation position on paper and the amount of correction regarding the scaling of an image on paper. Thus, in addition to the read image memory 64 described above, this controller 6 includes a test image memory 65 that stores test image data representing a test image used in computation of the amounts of correction, which will be described below. The controller 6 also includes a first tray memory 61, a second tray memory 62, and a third tray memory 63 that store the computed amounts of correction and that correspond to the first tray 70A, the second tray 70B, and the third tray 70C described above, respectively. A reason why memories that store the amounts of correction are provided for the individual trays in this manner is that the degree of misregistration of an image formed on paper and the degree of variations in the scaling of images possibly differ depending on a path along which paper is taken out from the tray. Each memory stores amounts of correction for correcting the image formation position on paper and for correcting the scaling of the image that are used when an image is formed on paper taken out from a tray corresponding to the memory. Which size of paper is held by each of the first tray 70A, the second tray 70B, and the third tray 70C is set in advance. Note that the last setting is valid even after the power is turned off and on unless the setting is made again. Also, a configuration for automatically detecting the size may be included.

When an image based on image data stored in the read image memory 64 is formed on paper, the controller 6 reads out the amounts of correction from a memory corresponding to a tray that is automatically selected in accordance with the dimensions of the image or the like or a tray that is specified by the user by operating the operation section 270. Based on the read amounts of correction, the controller 6 performs various kinds of correction processing, such as image-formation-position correction processing and image-scaling correction processing, on the image data stored in the read image memory 64. The controller 6 then sends the image data having undergone the correction processing to the exposure unit 5 to cause the exposure unit 5 to form electrostatic latent images based on the image data. Here, the amounts of correction are constituted by two kinds: the amount of front side correction which is used when an image is formed on the front side in double-sided printing, and the amount of back side correction which is used when an image is formed on the back side in double-sided printing. In image formation when double-sided printing is specified, correction processing is performed, based on the amount of front side correction, on image data that represents an image to be printed on the front side, which is a side on which an image is to be printed first among both sides of paper; and correction processing is performed, based on the amount of back side correction, on image data that represents an image to be printed on the back side, which is a side on which an image is to be printed second. On the other hand, in image formation when single-sided printing is specified, correction processing is performed on image data based on the amount of front side correction.

An operation sequence from reading of an image to formation of an image on paper performed by this image forming apparatus 10 will be described. Here, the description will be given of an example case where the stationary reading mode is adopted.

The user positions paper 300 on the transparent glass 250 so that a side of the paper 300 having a to-be-read image faces down in FIG. 1 between the transparent glass 250 and the upper covering 260. The user specifies a tray that holds paper used in image formation, selects double-sided printing or single-sided printing, and specifies the number of copies to be output through the operation section 270. The user then presses a start button, not illustrated, among the group of buttons 2702, to give an instruction to start image reading and image formation. In response to the pressing, light is radiated from the lamp 211 of the first carriage 210. The light radiated by the lamp 211 is reflected by the paper 300 through the transparent glass 250. The reflected light forms an image on the line sensor 240 by the lens unit 230 via the first mirror 212 of the first carriage 210 and the second mirror 221 and the third mirror 222 of the second carriage 220. In FIG. 1, the path of this light is illustrated by a dotted line arrow in the image reading section 200. The first carriage 210 moves in the direction (sub-scanning direction) of the solid line arrow in the image reading section 200 while performing such radiation of light by using the lamp 211. The second carriage 220 also moves in the same direction at a half the moving speed of this first carriage 210. In this manner, the entire image on the paper 300 is irradiated and the reflected light from every position of the image forms an image on the line sensor 240 with the optical-path length thereof being maintained to be substantially constant. In this way, image data based on the reflected light for the entire image is generated by the line sensor 240. The generated image data undergoes various kinds of signal processing, such as analog-to-digital conversion, by a processing circuit, not illustrated. The resultant image data is sent to the controller 6, and is stored in the read image memory 64 in the controller 6. Generation of image data and storage of the image data in the read image memory 64 described above are performed every time the user presses the start button after positioning a side of new paper having a new image on the transparent glass 250.

The controller 6 reads out the amounts of correction for the image data stored in the read image memory 64 from one of the first tray memory 61, the second tray memory 62, and the third tray memory 63 that corresponds to the specified tray. Based on the read out amounts of correction, the controller 6 performs various kinds of correction processing, such as image-formation-position correction processing and image-scaling correction processing, on the image data stored in the read image memory 64. The controller 6 then sends the image data having undergone the correction processing to the exposure unit 5 to cause the exposure unit 5 to form electrostatic latent images based on the image data on the charged developer carriers 11K, 11C, 11M and 11Y. The formed electrostatic latent images are developed by the developing devices in the corresponding image forming units 1K, 1C, 1M, and 1Y by using toners in developers including toners of the colors corresponding to the individual image forming units 1K, 1C, 1M, and 1Y. As a result, developed images of the individual colors are formed. The developed images of the individual colors formed in the corresponding image forming units 1K, 1C, 1M, and 1Y in this manner are sequentially transferred (first transfer) onto the intermediate transfer belt 2 by the first transfer rollers 110K, 110C, 110M, and 110Y corresponding to the developer carriers 11K, 11C, 11M, and 11Y, respectively, so as to overlap one another, whereby a first transfer image of multiple colors is formed. The intermediate transfer belt 2 having this first transfer image of multiple colors thereon is then transported to the second transfer roller 31. On the other hand, paper held in the tray specified from among the first tray 70A, the second tray 70B, and the third tray 70C is taken out in response to formation of the first transfer image of multiple colors and is transported by a first pair of transportation rollers 41a and a second pair of transportation rollers 41b. The orientation of the paper is adjusted by a pair of registration rollers 40. Furthermore, the paper is fed by the pair of registration rollers 40 so that the paper is fed to a position of the second transfer roller 31 in synchronization with a timing at which the first transfer image on the intermediate transfer belt 2 reaches the position. The first transfer image of multiple colors is then transferred (second transfer) by the second transfer roller 31 onto this fed paper. The paper having undergone the second transfer is further transported by a transportation belt 33. Fixing processing is performed on the second transfer image on the paper by the fixing device 4. In FIG. 1, a paper transportation path at this time is illustrated as a path of a right-pointing dotted line arrow in the image forming section 100. Residual toners on the intermediate transfer belt 2 are removed by the cleaning device 22 after the second transfer onto the paper.

In the case where single-sided printing is selected, the paper passes along this paper transportation path once. After the second transfer image is fixed by the fixing device 4, the paper passes between a pair of output rollers 40*a* and is output to the paper output tray 10*a*.

On the other hand, in the case where double-sided printing is selected, after the second transfer image is transferred and fixed on one side of paper as a result of the paper passing along the above-described paper transportation path illustrated by the right-pointing arrow, the paper passes between a first pair of double-sided transportation rollers 40*b* and is transported downward along a path illustrated by an downward arrow without heading to the pair of output rollers 40*a*. Thereafter, the rotation direction of a second pair of double-sided transportation rollers 40*c* reverses, which makes the paper transportation direction upward. Further, the paper passes along a path illustrated by a left-pointing dotted line arrow, passes between a third pair of double-sided transportation rollers 40*d* and a fourth pair of double-sided transportation rollers 40*e*, and heads to the second transfer roller 31 again through the first pair of transportation rollers 41*a*, the second pair of transportation rollers 41*b*, and the pair of registration rollers 40. Before the paper reaches the position of the second transfer roller 31 again after the last transfer onto the paper performed by the second transfer roller 31, a new first transfer image of multiple colors has been formed on the intermediate transfer belt 2 in accordance with the above-described method. At the time when the paper reaches the second transfer roller 31 for the second time, the new first transfer image of multiple colors is second-transferred onto a side of the paper opposite to the side on which the second transfer is performed last time. Fixing processing is then performed by the fixing device 4 on the new second transfer image on the opposite side. The paper having the fixed images on both sides is output to the paper output tray 10*a*. Residual toners on the intermediate transfer belt 2 are removed by the cleaning device 22 after the second transfer onto the opposite side of the paper.

The above is the description regarding the operation of this image forming apparatus 10. The image forming apparatus 10 forms a read image on paper in this manner.

The above description has been given of the example case where the stationary reading mode is adopted. However, when the transporting reading mode is adopted, image reading and image formation are the same as the above-described ones except that an image on the currently transported paper is read using the first carriage 210 that is stationary.

In the above description, image-formation-position correction processing is performed on image data to correct the image formation position on paper. However, the present invention may be to correct the image formation position on paper by using a method that is different from the correction processing performed on image data. For example, regarding correction of the position of the entire image on paper in the paper transportation direction, the correction may be performed by controlling the pair of registration rollers 40 to change the timing at which the paper is fed toward the second transfer roller 31. Regarding correction of the position of the entire image on paper in a direction perpendicular to the paper transportation direction, the correction may be performed by controlling the exposure unit to change the position from which an electrostatic latent image is formed on each developer carrier in a direction (a rotation axis direction of each developer carrier) perpendicular to the paper transportation direction.

As described above, this image forming apparatus 10 forms a test image on paper, reads the test image on the paper by using the image reading section 200, and computes various amounts of correction, such as the amount of correction regarding the image formation position on paper and the amount of correction (scaling) regarding the dimensions of the image on paper. This image forming apparatus 10 computes these amounts of correction based on a test image that is formed using the image forming unit 1K for black (K).

Note that the amounts of correction for images that are formed by using the image forming units 1C, 1M, and 1Y of the other colors, namely, cyan (C), magenta (M), and yellow (Y), respectively, are obtainable from the amounts of correction that are computed by using the image forming unit 1K for black (K) through the above-described adjustment of relative positions and scaling between images formed on the intermediate transfer belt 2 as a result of the first transfer.

The following describes computation of the amount of correction regarding scaling of an image on paper, which is a feature of this exemplary embodiment.

The test image memory 65 of the controller 6 of the image forming apparatus 10 illustrated in FIG. 1 stores dimension (scaling) correction test image data, which is one kind of test image data.

In this image forming apparatus 10, an amount-of-correction computation mode is specified through an operation performed on the operation section 270. Further, a dimension correction mode, which is a mode in which the amount of correction for correcting the dimensions (scaling) of an image is computed, is specified in the amount-of-correction computation mode.

In this dimension correction mode, a tray used this time is specified from among the first tray 70A, the second tray 70B, and the third tray 70C. Also, when the dimensions of images on both sides of paper are to be corrected, a double-sided printing mode is specified.

Thereafter, using the image forming unit 1K for black (K), this image forming apparatus 10 forms a dimension correction image which is used to correct the dimensions of an image and which is one kind of test image, on paper that had been held in the specified tray. This dimension correction image includes plural image dimension correction marks at positions separated from each other on paper.

The dimension correction image formed on the paper in this dimension correction mode is read after the paper is positioned on the transparent glass 250 of the image reading section 200. Herein, image data that is obtained by reading the dimension correction image from the paper and that represents the dimension correction image in the dimension correction mode is referred to as dimension correction image data.

The controller 6 illustrated in FIG. 1 performs computation based on this dimension correction image data, generates dimension correction data that represents the amount of correction for correcting the dimensions of images, and stores the generated dimension correction data.

When forming an image to be provided to the user, this image forming apparatus 10 corrects image data based on the dimension correction data and forms an image based on the corrected image data on paper.

The image forming apparatus 10 according to this exemplary embodiment has a first computation mode and a second computation mode, as computation modes in which the dimension correction data is computed on the basis of the dimension correction image data that is obtained by reading the dimension correction image from paper. The first computation mode is a mode in which first dimension correction data, which is one kind of the dimension correction data, is generated on the basis of distances between plural marks in data of the dimension correction image that is represented by the dimension correction image data. The second computation mode is a mode in which second dimension correction data, which is one kind of the dimension correction data, is generated on the basis of the distances between individual edges of paper and corresponding marks in data of the dimension correction image that is represented by the dimension correction image data.

Figure 2A:
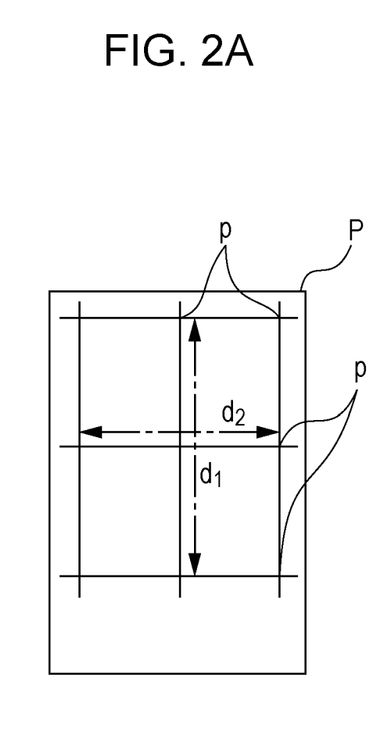
FIGS. 2A and 2B are schematic diagrams illustrating a dimension correction image before and after dimension correction based on a first computation mode is performed, respectively.
Figure 2B:
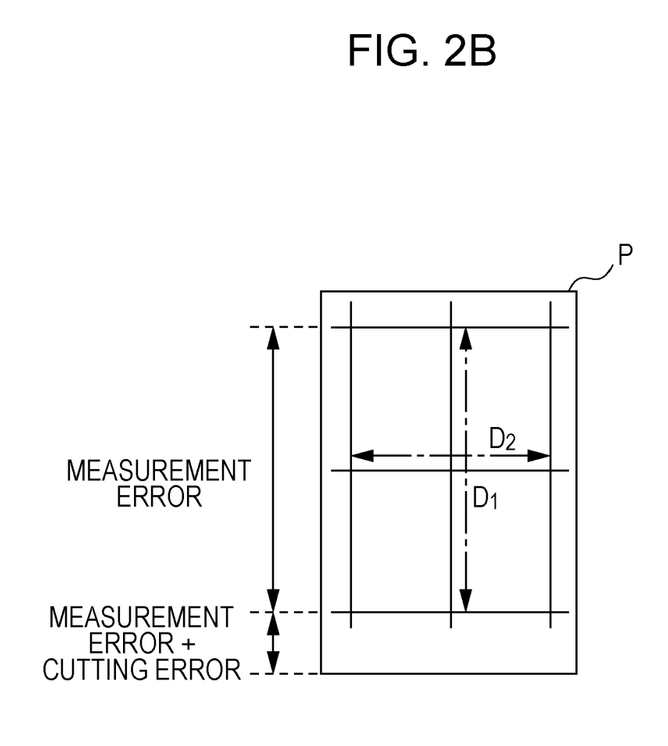

FIGS. 2A and 2B are schematic diagrams illustrating a dimension correction image before and after dimension correction based on the first computation mode is performed, respectively.

FIG. 2A illustrates an uncorrected dimension correction image based on the dimension correction image data which is obtained by reading the dimension correction image from paper. FIG. 2B illustrates a dimension correction image based on the corrected dimension correction image data obtained when the dimension correction image data is corrected on the basis of the first dimension correction data that is obtained from computation in the first computation mode.

As illustrated in FIG. 2A, this dimension correction image includes vertical lines and horizontal lines. The points P of intersection of the vertical lines and the horizontal lines serve as marks used in dimension measurement. In the first computation mode, distances $d_1$ and $d_2$ between these marks p are computed as illustrated by dot-and-dash lines in FIG. 2A. Based on the distances $d_1$ and $d_2$, an increase or a decrease in the dimensions of the image is computed. The first dimension correction data that represents the amount of correction for correcting the scaling is determined so that the distances $d_1$ and $d_2$ between the marks p are equal to predetermined standard distances $D_1$ and $D_2$, respectively, as illustrated in FIG. 2B.

In this first computation mode, computation is based on the distances between the marks p. As illustrated in FIG. 2B, the dimensions of the corrected image possibly contain dimension errors due to errors in measurement of the distances between the marks. Specifically, in the image reading section 200 of the image forming apparatus 10 illustrated in FIG. 1, image data obtained by reading an image from paper has a distortion due to a distortion of an optical system or the like. If the distances are measured based on this image data, the measurement possibly contains measurement errors corresponding to the distortion caused at the time of reading. Also, the dimension from an edge of the image to an edge of the paper P possibly contains the above-described measurement errors and cutting errors of paper P. Here, the cutting errors of the paper P indicate errors in the cutting dimensions caused when paper having a large area is cut to create this paper P.

Figure 3A:
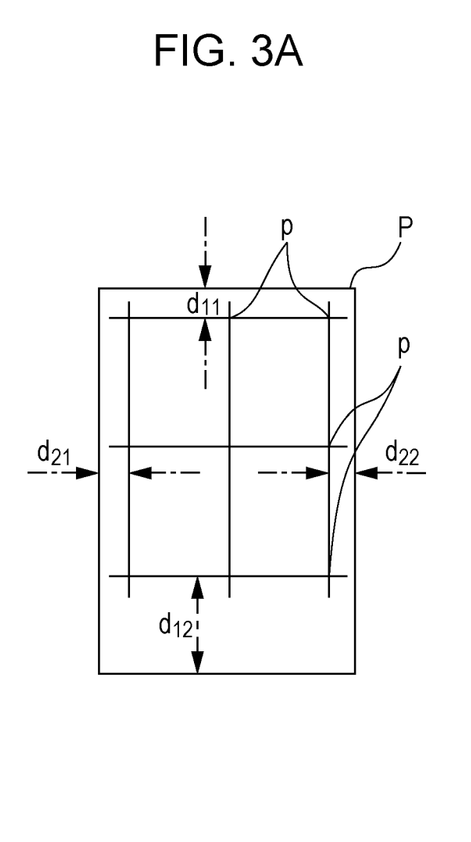
FIGS. 3A and 3B are schematic diagrams illustrating a dimension correction image before and after dimension correction based on a second computation mode is performed, respectively.
Figure 3B:
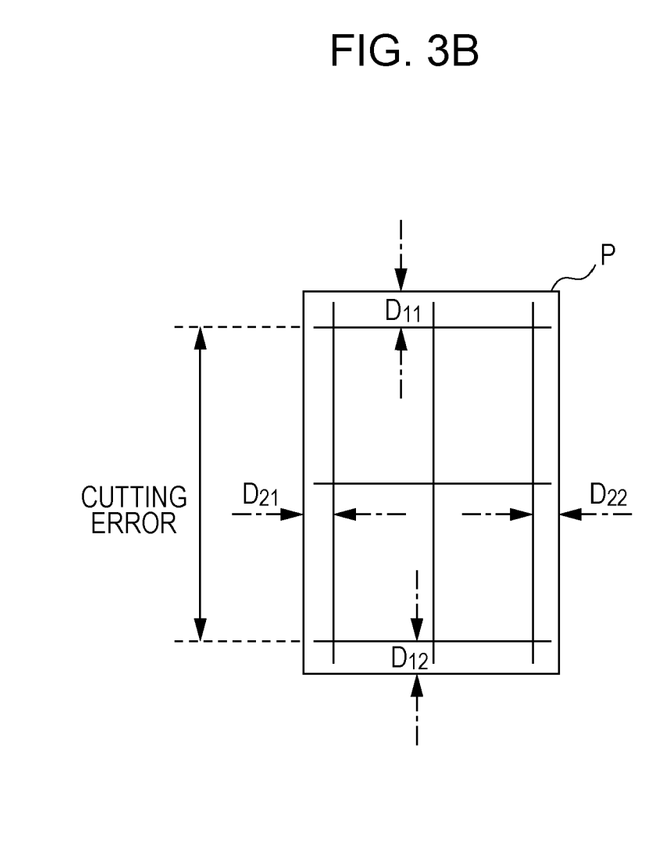

FIGS. 3A and 3B are schematic diagrams illustrating a dimension correction image before and after dimension correction based on the second computation mode is performed, respectively.

FIG. 3A is a schematic diagram illustrating an uncorrected dimension correction image based on the dimension correction image data which is obtained by reading the dimension correction image from paper as in FIG. 2A. FIG. 3B illustrates a dimension correction image based on the corrected dimension correction image data obtained when the dimension correction image data is corrected on the basis of the second dimension correction data that is obtained from computation in the second computation mode.

In the second computation mode, distances $d_{11}$, $d_{12}$, $d_{21}$, and $d_{22}$ between individual marks p and corresponding edges of paper P are computed as illustrated by dot-and-dash lines in FIG. 3A. Based on these distances and standard dimensions of the paper P, an increase or decrease in the dimensions of the image is computed. The second dimension correction data that represents the amount of correction for correcting the scaling is determined so that the distances $d_{11}$, $d_{12}$, $d_{21}$, and $d_{22}$ between the individual marks p and the corresponding edges of the paper P are equal to the standard distances $D_{11}$ $D_{12}$, $D_{21}$, and $D_{22}$, respectively, as illustrated in FIG. 3B.

In the second computation mode, computation is based on the distances between the individual marks p and the corresponding edges of the paper P. As illustrated in FIG. 3B, the dimensions of an image formed on paper on the basis of the corrected image data contain cutting errors of the paper. The measurement errors in the distances between the individual marks p and the corresponding edges of the paper P are not zero but are smaller than the distances between the marks p illustrated in FIG. 2A. Accordingly, the influence of the distortion caused at the time of reading by the image reading section 200 is small and the cutting errors are dominant.

Correction based on the first dimension correction data that is determined in the first computation mode described with reference to FIGS. 2A and 2B and correction based on the second dimension correction data determined in the second computation mode described with reference to FIGS. 3A and 3B have following advantages and disadvantages.

If cut paper has correct dimensions, an image having correct dimensions is formed on the paper in the case where the second computation mode illustrated in FIGS. 3A and 3B is adopted.

On the other hand, if the dimensions of paper contain cutting errors, the cutting errors are reflected in the dimensions of an image on the paper and consequently the dimensions of the image on the paper contain errors. However, when the dimensions of margins between individual edges of the image and corresponding edges of the paper are more problematic than the errors in the dimensions of the image, this second computation mode is preferably adopted even though there are cutting errors.

In the case of the first computation mode illustrated in FIGS. 2A and 2B, the dimensions of an image on paper are substantially correct but errors in the dimensions are larger due to measurement errors compared with a case where it is expected that the paper is cut in the correct dimensions. Also, when the paper has large cutting errors, variations in the margins around the image possibly stand out.

Because there are the advantages and disadvantages described above, the two kinds of dimension correction data that are determined in the two computation modes are selectively used depending on the image formation mode and the user specification.

When the computation modes are selectively used depending on the image formation mode, in a mode of forming images on both sides of paper, the second dimension correction data that is determined in the second computation mode described with reference to FIGS. 3A and 3B is used to make the dimensions of the margins around the images formed on both sides uniform rather than making the absolute dimensions of the images uniform. Also, for example, in a cutting planed mode in which it is planned to cut paper after forming an image on the paper, the margins are not problematic but the dimensions of the image are problematic. Also in this case, cutting errors of the paper are possibly large. Thus, the first dimension correction data that is determined in the first computation mode is used. This cutting planned mode may be recognized by detecting that images are formed outside an image-quality guaranteed region on the basis of the image data and by determining the images outside the region as so-called crossmarks serving as marks for cutting.

Alternatively, for example, after calibration of the image reading section 200, the distances $d_1$ and $d_2$ illustrated in FIG. 2A are measured fairly precisely. Thus, for a certain period from the calibration, the first dimension correction data that is determined in the first computation mode may be used. Alternatively, when knowledge about relationships between errors in the dimensions of paper and trays is available in such a manner that precisely cut paper is held in the first tray 70A illustrated FIG. 1 and paper containing cutting errors is held in the second tray 70B, the first dimension correction data obtained in the first computation mode and the second dimension correction data obtained in the second computation mode may be switched between for each tray.

Figure 4:
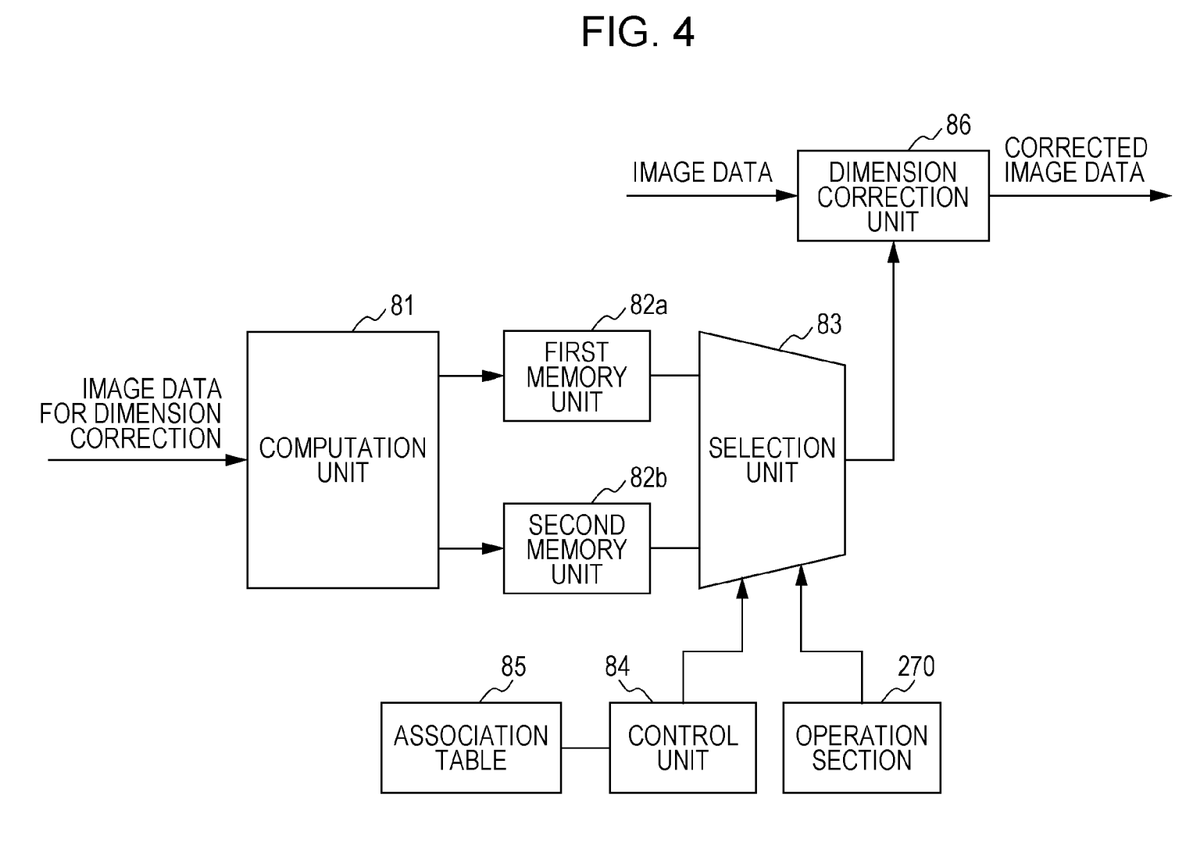
FIG. 4 is a block diagram illustrating an image-dimension-correction computation process performed by a controller of the image forming apparatus illustrated in FIG. 1.

FIG. 4 is a block diagram illustrating an image-dimension-correction computation process performed by the controller 6 of the image forming apparatus 10 illustrated in FIG. 1.

As described before, in the dimension correction mode, a dimension correction image based on dimension correction test image data is formed on paper. The paper is then positioned at the image reading section 200, and the dimension correction image is read from the paper. In this manner, the dimension correction image data is generated. This dimension correction image data is input to a computation unit 81 included in the controller 6.

Figure 5:
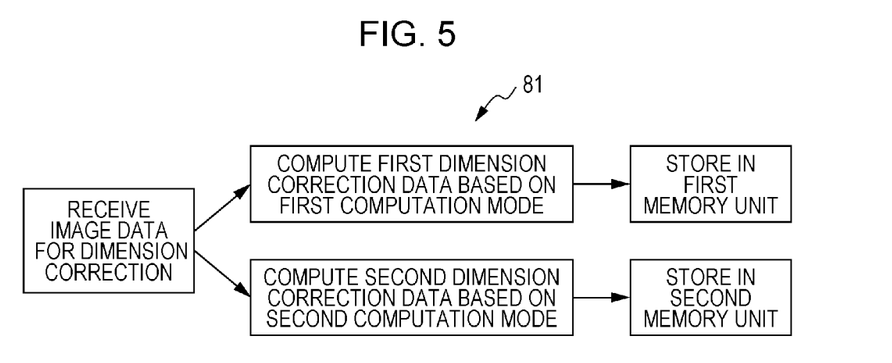
FIG. 5 is a block diagram illustrating contents of computation performed by a computation unit.

FIG. 5 is a block diagram illustrating contents of computation performed by the computation unit 81.

This computation unit 81 receives the dimension correction image data that is obtained by the image reading section 200 reading the dimension correction image, and performs both computation of the first dimension correction data in the first computation mode (see FIGS. 2A and 2B) and computation of the second dimension correction data in the second computation mode (see FIGS. 3A and 3B). The first dimension correction data computed in the first computation mode is stored in a first memory unit 82a illustrated in FIG. 4, whereas the second dimension correction data computed in the second computation mode is stored in a second memory unit 82b illustrated in FIG. 4.

The image forming apparatus 10 illustrated in FIG. 1 includes three trays: the first tray 70A, the second tray 70B, and the third tray 70C. As described before, in the dimension correction mode, one of the three trays is specified and the dimension correction image is formed on paper that had been held in the specified tray. Accordingly, the dimension correction data determined from the computation based on the dimension correction image data that is obtained by reading the dimension correction image on the paper is data associated with the tray. Accordingly, the first memory unit 82a and the second memory unit 82b are included in each of the first tray memory 61, the second tray memory 62, and the third tray memory 63 that are included in the controller 6 illustrated in FIG. 1. The first dimension correction data and the second dimension correction data computed by the computation unit 81 are respectively stored in the first memory unit 82a and the second memory unit 82b included in a memory that corresponds to the tray from which the paper had been taken out for formation of the dimension correction image.

The above-described computation and storage of the first dimension correction data and the second dimension correction data are performed for each tray by using the dimension correction image formed on paper held in each of the first tray 70A, the second tray 70B, and the third tray 70C. When the dimension correction image is formed on both sides of paper, the above-described processing is performed twice for both sides. The resultant pieces of dimension correction data are separately stored as pieces of dimension correction data for a first side and pieces of dimension correction data for a second side.

An association table 85 illustrated in FIG. 4 pre-stores a list, which indicates which of the first dimension correction data and the second dimension correction data is to be used in association with the image formation mode and the tray.

Before an image to be provided to the user is formed, a control unit 84 refers to the association table 85 and recognizes which of the first dimension correction data and the second dimension correction data is associated with the image formation mode used this time and the tray that holds paper to be used this time. The control unit 84 then controls a selection unit 83 to send, in the case where the first dimension correction data is used, the first dimension correction data stored in the first memory unit 82a to a dimension correction unit 86 and to send, in the case where the second dimension correction data is used, the second dimension correction data stored in the second memory unit 82b to the dimension correction unit 86.

As described above, the first memory unit 82a and the second memory unit 82b are provided for each tray though the illustration thereof is simplified in FIG. 4. The control unit 84 causes the selection unit 83 to select the first memory unit 82a or the second memory unit 82b that corresponds to the tray that holds paper to be used in this image formation.

While the control unit 84 automatically switches between the first memory unit 82a and the second memory unit 82b in accordance with the association table 85 in a manner described above, the first memory unit 82a and the second memory unit 82b may be switched between by a user operation performed on the operation section 270 (see also FIG. 1).

To the dimension correction unit 86, image data obtained by the image reading section 200 reading an image is input. This dimension correction unit 86 performs dimension correction processing on the input image data on the basis of the first dimension correction data or the second dimension correction data sent from the selection unit 83. Then, the image forming section 100 of the image forming apparatus 10 forms an image based on the corrected image data on paper.

Although the details are omitted here, in the double-sided printing mode, dimension correction data for a first side is used when an image is formed on the first side, whereas dimension correction data for a second side is used when an image is formed on the second side.

Figure 6:
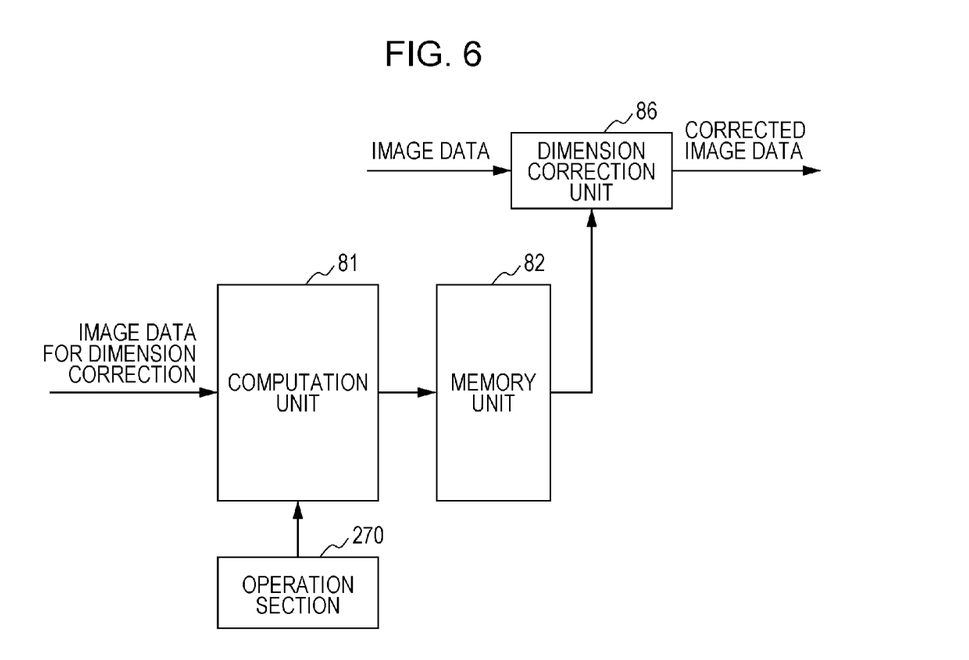
FIG. 6 is a block diagram according to a second exemplary embodiment that replaces FIG. 4.

FIG. 6 is a block diagram according to a second exemplary embodiment that replaces FIG. 4.

This second exemplary embodiment differs from the first exemplary embodiment that has been described above in part illustrated in this block diagram. Herein, only FIG. 6 will be described.

The user operates an operation section 270 to specify, in a computation unit 81, which of the first computation mode and the second computation mode is to be used. Based on input dimension correction image data, the computation unit 81 computes dimension correction data in the specified one of the computation modes, and stores the dimension correction data in a memory unit 82. As in the first exemplary embodiment, this memory unit 82 is provided for each tray. The dimension correction unit 86 reads out the dimension correction data from the memory unit 82 corresponding to the tray used this time, and performs dimension correction processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus comprising:
   an image reading section that includes a paper table on which paper is to be positioned and that reads an image on paper positioned on the paper table to generate image data; and
   an image forming section that forms an image on paper based on image data,
   wherein the image forming section has a dimension correction mode in which a dimension correction image used to correct dimensions of an image is formed on paper, the dimension correction image including a plurality of marks at positions separated from each other on the paper,
   wherein the image forming section includes
      a computation unit that performs computation by using dimension correction image data to generate dimension correction data used to correct dimensions of an image, the dimension correction image data being obtained by the image reading section by reading, from paper on which the dimension correction image has been formed and which is positioned on the paper table, the dimension correction image, and
      a memory that stores the dimension correction data generated by the computation unit,
   wherein the image forming section corrects image data in accordance with the dimension correction data stored in the memory and forms an image based on the corrected image data, and
   wherein the computation unit has a first computation mode in which first dimension correction data is generated on the basis of distances between the plurality of marks in data of a dimension correction image represented by the dimension correction image data and a second computation mode in which second dimension correction data is generated on the basis of distances between individual edges of paper and the corresponding marks in data of a dimension correction image represented by the dimension correction image data, the first dimension correction data being one kind of the dimension correction data, the second dimension correction data being one kind of the dimension correction data, and
   wherein the image forming section corrects the image data by using the first dimension correction data in a first image formation mode and using the second dimension correction data in a second image formation mode.

2. The image forming apparatus according to claim 1, wherein the memory includes a first memory and a second memory, and
   wherein the computation unit generate both the first dimension correction data and the second dimension correction data, and stores the first dimension correction data in the first memory and stores the second dimension correction data in the second memory.

3. The image forming apparatus according to claim 2, further comprising
   an operation section that accepts an operation for switching between the first memory and the second memory,
   wherein the image forming section corrects image data by using dimension correction data stored in a memory selected from among the first memory and the second memory as a result of the operation accepted by the operation section.

4. The image forming apparatus according to claim 2, further comprising
   an operation section that accepts an operation for switching between the first memory and the second memory,
   wherein the image forming section corrects image data by using dimension correction data stored in a memory selected from among the first memory and the second memory as a result of the operation accepted by the operation section.

5. The image forming apparatus according to claim 1, further comprising
   an operation section that accepts an operation for switching between the first computation mode and the second computation mode,
   wherein the computation unit generates the first dimension correction data or the second dimension correction data according to a computation mode selected from among the first computation mode and the second computation mode as a result of the operation accepted by the operation section.

6. The image forming apparatus according to claim 1, wherein the image forming section corrects the image data by using the first dimension correction data if the image formation mode is a cutting planned mode in which the paper is cut after the image is formed on the paper.

7. The image forming apparatus according to claim 1, wherein the image forming section corrects the image data by using the second dimension correction data if the image formation mode is a mode of forming images on both sides of the paper.

8. The image forming apparatus according to claim 1, wherein the image forming section corrects the image data by using the first dimension correction data for a certain period if the image reading section is calibrated.

9. An image forming method comprising:
   reading an image on paper positioned on a paper table to generate image data; and
   forming on paper an image based on image data,
   wherein in the forming, a dimension correction image used to correct dimensions of an image is formed on paper in a dimension correction mode, the dimension correction image including a plurality of marks at positions separated from each other on the paper,
   wherein the forming includes
      performing computation by using dimension correction image data to generate dimension correction data used to correct dimensions of an image, the dimension correction image data being obtained by reading, from paper on which the dimension correction image has been formed and which is positioned on the paper table, the dimension correction image, and
      storing the generated dimension correction data in a memory, wherein in the forming, image data is corrected in accordance with the dimension correction data stored in the memory and an image based on the corrected image data is formed, and wherein in the performing computation, first dimension correction data is generated in a first computation mode on the basis of distances between the plurality of marks in data of a dimension correction image represented by thedimension correction image data and second dimension correction data is generated in a second computation mode on the basis o distances between individual edges of paper and the corresponding marks in data of a dimension correction image represented by the dimension correction image data, the first dimension correction data being one kind of the dimension correction data, the second dimension correction data being one kind of the dimension correction data, wherein the forming an image on paper based on the image data corrects the image data by using one of the first dimension correction data and the second dimension correction data in accordance with an image formation mode, and wherein the forming an image on paper based on the image data corrects the image data by using the first dimension correction data if the image formation mode is a cutting planned mode in which the paper is cut after the image is formed on the paper, and the image forming section corrects the image data by using the second dimension correction data if the image formation mode is a mode of forming images on both sides of the paper.

10. An image reading apparatus comprising:

an image reading section that includes a paper table on which paper is to be positioned and that reads an image on paper positioned on the paper table to generate image data;

an image forming section that forms an image on paper based on image data; and a computation unit that performs computation by using dimension correction image data to generate dimension correction data used to correct dimensions of an image, the dimension correction image data being obtained by the image reading section by reading, from paper on which a dimension correction image has been formed and which is positioned on the paper table, the dimension correction image, the dimension correction image including a plurality of marks at positions separated from each other on the paper, wherein the computation unit has a first computation mode in which first dimension correction data is generated on the basis of distances between the plurality of marks in data of a dimension correction image represented by the dimension correction image data and a second computation mode in which second dimension correction data is generated on the basis of distances between individual edges of paper and the corresponding marks in data of a dimension correction image represented by the dimension correction image data, the first dimension correction data being one kind of the dimension correction data, the second dimension correction data being one kind of the dimension correction data, wherein the image forming section corrects the image data by using one of the first dimension correction data and the second dimension correction data in accordance with an image formation mode, and wherein the image forming section corrects the image data by using the first dimension correction data if the image formation mode is a cutting planned mode in which the paper is cut after the image is formed on the paper, and the image forming section corrects the image data by using the second dimension correction data if the image formation mode is a mode of forming images on both sides of the paper.

\* \* \* \* \*